INVENTOR.
THEODORE F. SCHWARTZ
BY

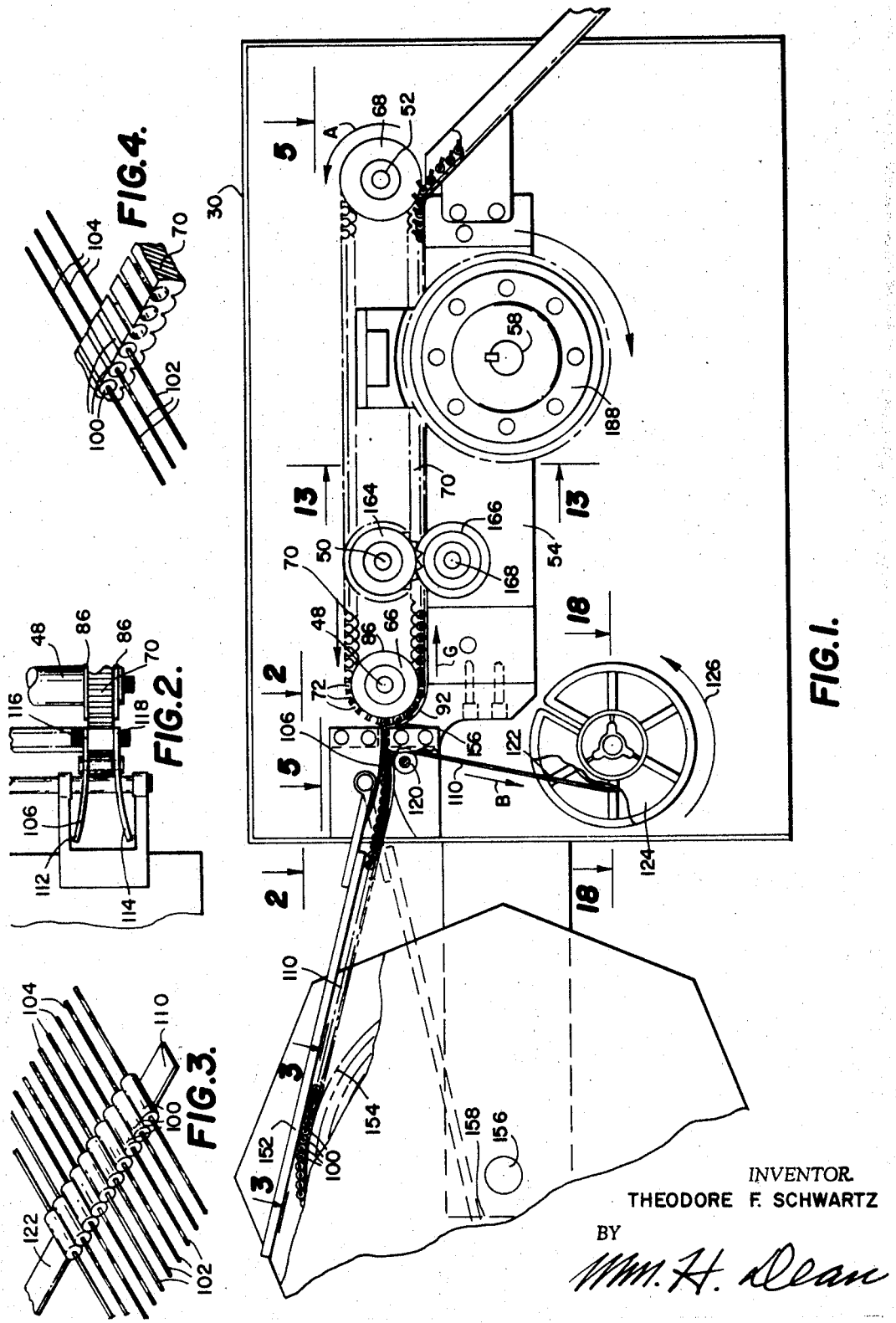

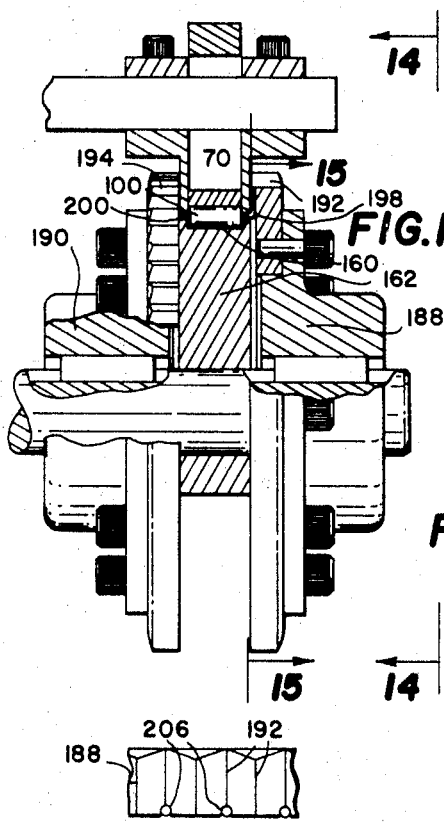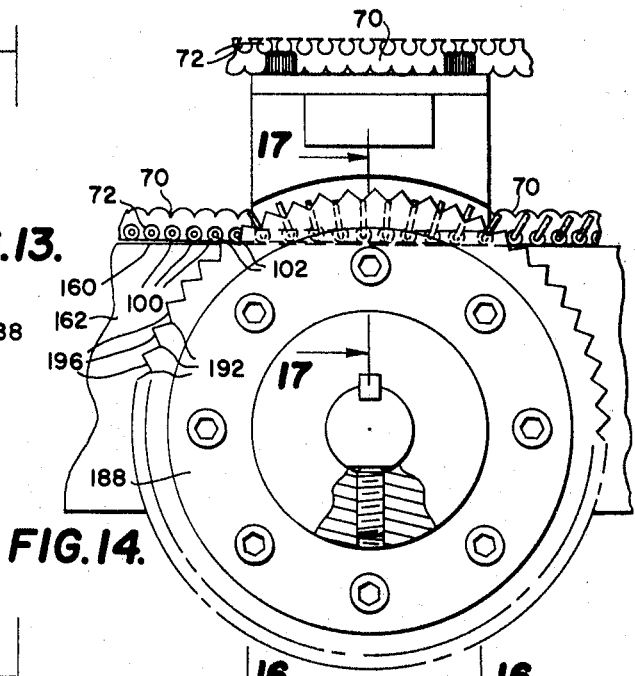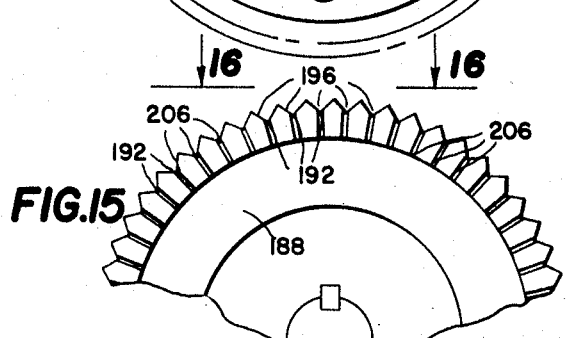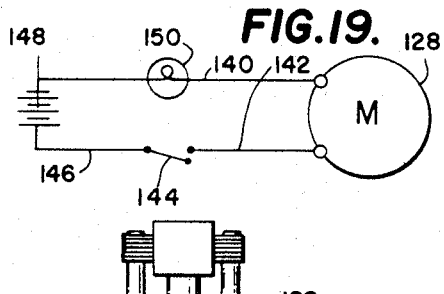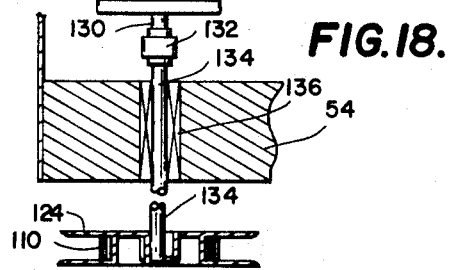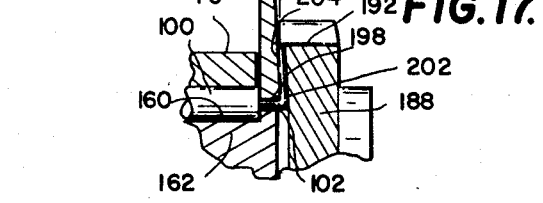

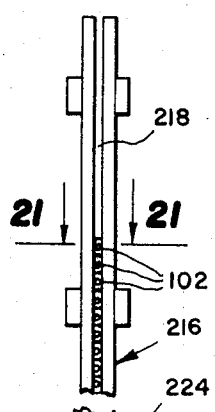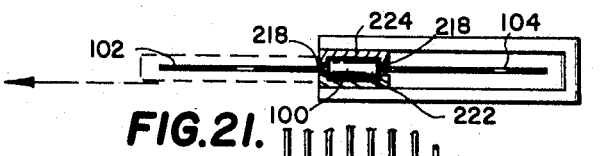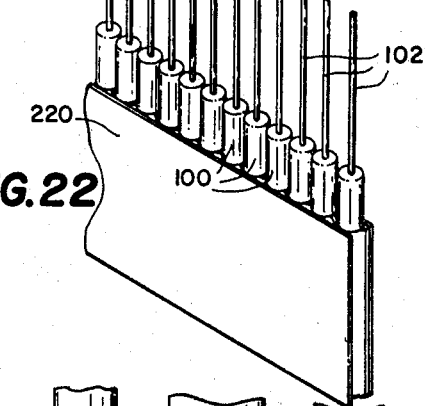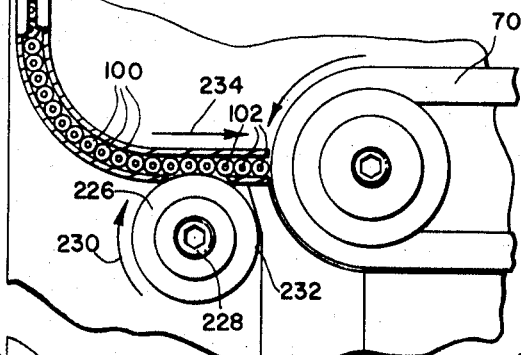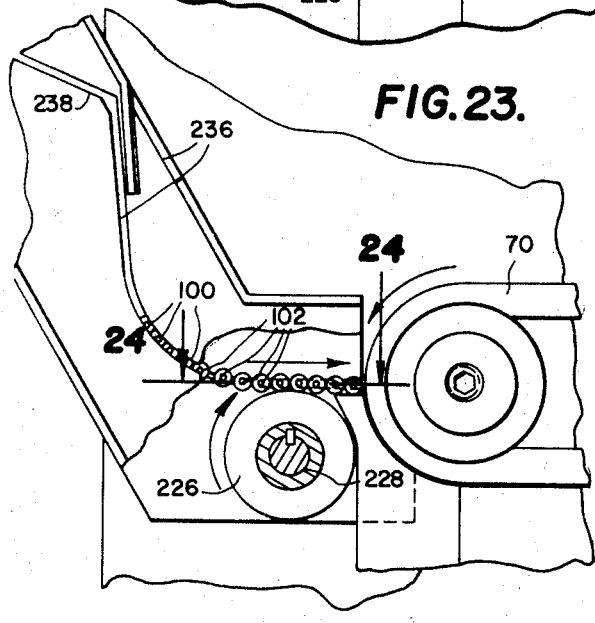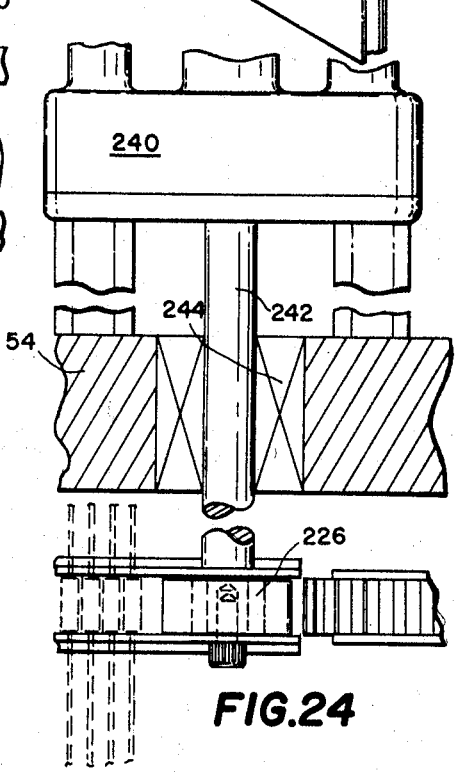

United States Patent Office 3,439,520
Patented Apr. 22, 1969

3,439,520
MACHINE FOR CUTTING AND FORMING
OPPOSED AXIAL CONDUCTORS OF ELEC-
TRONIC COMPONENTS
Theodore F. Schwartz, 11660 St. Andrews Way,
Scottsdale, Ariz. 85251
Filed June 20, 1967, Ser. No. 647,497
Int. Cl. B21f 45/00, 11/00
U.S. Cl. 72—338                                     8 Claims

ABSTRACT OF THE DISCLOSURE

A machine for cutting and forming opposed axial conductors of electronic components which comprises rotary shearing and forming rotors operated in unison successively to shear off opposed axial conductors of electronic components, and to form the conductors at substantially right angles to the axes of the components; the shearing rotors and forming rotors being provided with notched peripheries, the notches engageable with the conductors for advancing them in certain continuity. The valleys of the notch portions of the forming rotors being disposed in offset relation to the axes of the conductors at their juncture with the electronic components, which are held in guides, such that rotary movement of the forming rotors cause the said valleys of said notches to force conductor portions of the electronic components laterally of their axes and to bend them at substantially right angles to the axes of the components, while they are restrained laterally by the said guide means; an endless belt having component receiving pockets adapted to carry components into said shearing and forming rotors; and means for continuously feeding components into said pockets.

---

This invention relates to a machine for cutting and forming opposed axial conductors of electronic components.

Background of the invention

In the preparation of electronic components, such as resistors, or the like, for integration into printed circuitry, it is necessary to shear the leads or conductors of the electronic components to a desired length, and then to form them at substantially right angles to the body axis of the components, so that the conductors may readily be inserted through openings in a printed circuit board to be soldered in place in the printed circuit structure. Heretofore, many of the production facilities have utilized hand labor to shear the conductors of such components to the desired length, and to form them in angular relation to the body of the component so as to be insertable through openings in a circuit board.

Some prior art machines have been developed for shearing and forming the conductors of electronic components, and these prior art machines have utilized reciprocating shearing mechanisms, as well as reciprocating dies for bending or forming the conductors of the components at substantially right angles to the bodies thereof. Such machines utilizing reciprocating shearing and forming dies have been limited as to rate of production, and have also created shock and bending stresses in close proximity to the emergence of the conductors from the bodies of electronic components, all of which has caused a high rejection rate of the components after the conductors have been sheared and formed. This is due to the fact that bending of the conductors close to the body may fracture the frangible material of the body, and thereby render the component subject to rejection. In the field of electronics, millions of minute electronic components, such as resistors or the like, are used daily, and the cost of labor not only to handle, shear, form, and place these components relative to circuitry boards is very great, and in addition, the cost of rejected parts due to damage has been very high, and consequently, a need has been recognized for a high production machine which automatically and precisely shears and forms conductors of electronic components, such that they may readily be inserted into connection with circuit boards.

Summary of the invention

The machine of the present invention employs a continuous component feed and endless belt means having component pockets disposed for continuously and synchronously feeding components to shearing and forming rotors, all operating at the same linear rate at the operating portions thereof, and wherein the opposed axial conductors of resistors, or the like, may be first sheared off to a desired length, and then formed to substantially right angles with respect to their original axes, and substantially parallel to each other so that they may be precisely inserted in circuitry board openings.

Accordingly, it is an object of the present invention to provide a highly efficient continuously fed and very productive machine for cutting and forming opposed axial conductors of electronic components wherein rotary shearing and forming rotor means are operated in unison and in continuity with each other for shearing and forming conductors of electronic components.

Another object of the invention is to provide novel means comprising a pair of opposed forming rollers having notched peripheries adapted at their notches to engage axial conductors of components, and wherein the valleys of the notches are disposed laterally relative to guides for the components so as to form the conductors of the components at right angles thereto, as the forming rollers rotate into position to move the valleys of the notches laterally relative to the axes of the components.

Further objects and advantages of the invention may be apparent from the following specification, appended claims and accompanying drawings.

Brief description of the drawings

FIG. 1 is a fragmentary side elevational view of a machine for cutting and forming opposed axial conductors of electronic components in accordance with the present invention;

FIG. 2 is a fragmentary top or plan sectional view taken from the line 2—2 of FIG. 1;

FIG. 3 is a sectional view taken from line 3—3 of FIG. 2;

FIG. 4 is an enlarged fragmentary perspective view showing a row of electronic components in the feed belt of machine of the invention;

FIG. 13 is an enlarged fragmentary sectional view taken from the line 13—13 of FIG. 1 showing portions further broken away and in section to amplify the illustration;

FIG. 14 is a fragmentary side elevational view of the structure shown in FIG. 13, taken from the line 14—14 of FIG. 13;

FIG. 15 is a fragmentary sectional view taken from the line 15—15 of FIG. 13;

FIG. 16 is and enlarged fragmentary elevational view of the periphery of a forming rotor of the invention taken from the line 16—16 of FIG. 15;

FIG. 17 is an enlarged fragmentary sectional view taken from the line 17—17 of FIG. 14;

FIG. 18 is a fragmentary sectional view taken from the line 18—18 of FIG. 1;

FIG. 19 is diagrammatic view of the electric wiring of the tape drive motor shown in FIG. 18;

FIG. 20 is an enlarged fragmentary side elevational view of a modified means of the invention for use in continuously feeding components to the component carrying belt of the present invention;

FIG. 21 is the sectional view taken from the line 21—21 of FIG. 20 showing the cross-section of the component belt feeding magazine of the modification shown in FIG. 20;

FIG. 22 is a fragmentary perspective view of a component holding cartridge for use in feeding components into the modified magazine structure illustrated in FIGS. 20 and 21;

FIG. 23 is another view similar to FIG. 20 but showing a modified form of component feed magazine disposed to deliver components to the component carrying belt of the invention; and FIG. 24 is an enlarged fragmentary plan sectional view taken from the line 24—24 of FIG. 23.

*Description of the preferred embodiments*

Figure 5:
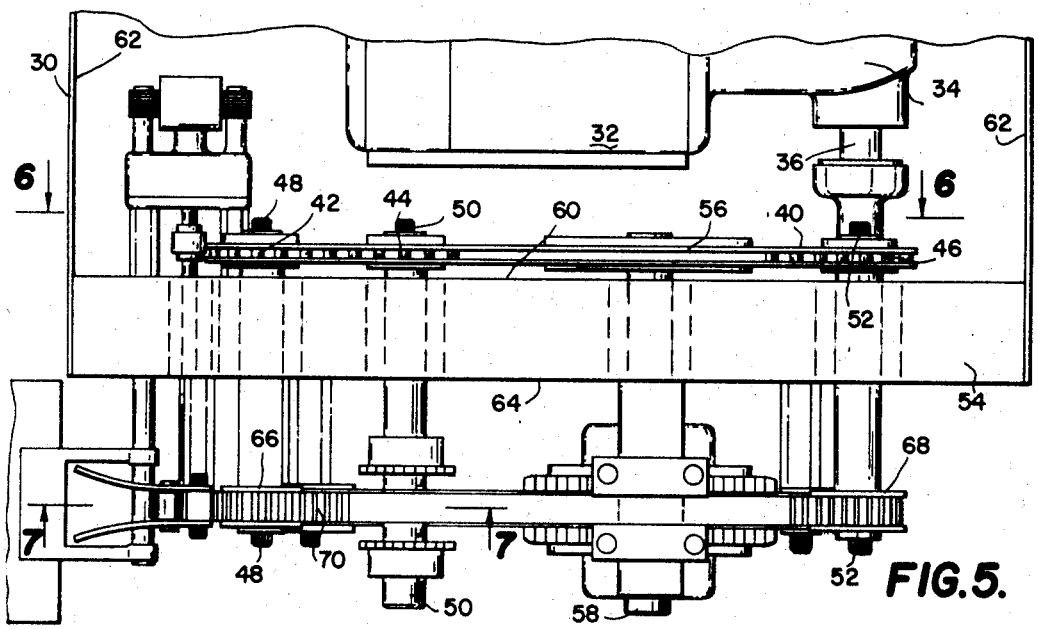
FIG. 5 is an enlarged fragmentary sectional view taken from the line 5—5 of FIG. 1.
Figure 6:
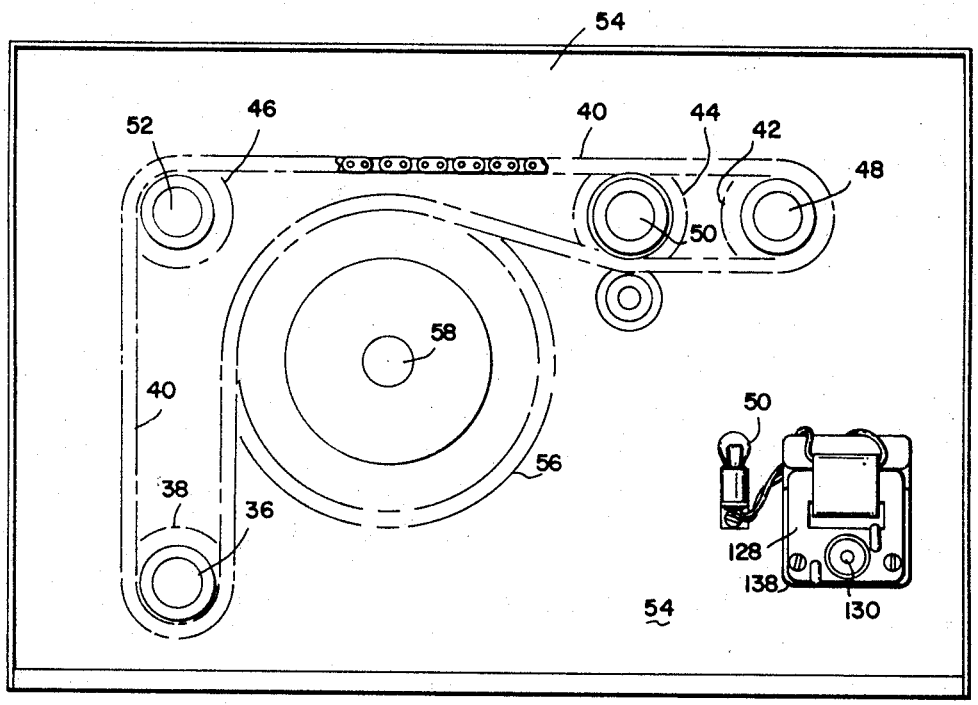
FIG. 6 is a sectional view taken from the line 6—6 of FIG. 5.

As shown in FIGS. 1, 5 and 6, the invention comprises a housing and frame structure generally designated 30. This housing and frame structure encloses a drive motor 32 having a reduction gear head 34 provided with an output shaft 36 driving a sprocket 38 mounted thereon. The sprocket 38 engages a chain 40, which also passes over sprockets 42 and 44, and an idler sprocket 46 mounted on respective shafts 48, 50, and 52. The shaft 52 is rotatably mounted in a bearing block 54 in a frontal portion of the frame housing, and the shafts 48 and 50 are rotatably mounted in the bearing block 54 with suitable end play resisting bearings to hold the shafts against axial movement relative to the bearing block 54. The chain 40 passes over a sprocket 56 mounted on a shaft 58, also journaled in the bearing block 54, and provided with suitable end play resisting bearings to prevent axial shifting of the shaft 58 relative to the bearing block 54. It will be understood that the shafts 36, 48, 50, and 58 all operate in unison, as will be hereinafter described in detail. It will be noted that all of the sprockets 38, 42, 44 and 56, and the sprocket 46 together with the chain 40, are mounted adjacent a rearward side 60 of the bearing block 54 internally of a hollow housing portion 62 of the housing frame 30. The shafts 48, 50, 58 and 36 project outwardly beyond a frontal side 64 of the bearing block 54, as shown best in FIG. 5 of the drawings.

Mounted on the shafts 48, 52, in spaced relation with the outer side of the bearing block 54, are flanged rollers 66 and 68, respectively. These flanged rollers 66 and 68 mount an endless component carrying belt 70 shown best in FIGS. 1, 5 and 7 of the drawings. The component carrying belt 70, shown on enlarged scale in FIGS. 7 and 8 of the drawings, is provided with component receiving and holding pockets 72 on its outer side, these pockets are expandible and contractible due to the resilient character of the material of which the belt 70 is made. Accordingly, it will be appreciated by those skilled in the art that the belt 70 may be of latex or any other suitable resilient material such as some synthetic materials which will permit resilient distortion of the belt 70 as will be hereinafter described in detail.

The belt 70 is provided with a scallop inner surface 74 adapted to engage corresponding scalloped or notched portions 76 in the periphery of the roller 66.

The roller 68 is provided with similar notched portions to engage the scalloped portions 74 of the belt 70 and each of the rollers 66 and 68 are provided with a pair of flanges disposed outwardly of the scalloped portions 76 to retain the belt 70 on the respective rollers.

The scalloped portions 76 are closely adjacent recessed structures which receive corresponding closely adjacent projection portions 74 of the belt 70, thus to permit the rollers 66 and 68 to drive the belt 70, generally in the direction of an arrow A in FIG. 1 of the drawings.

Figure 11:
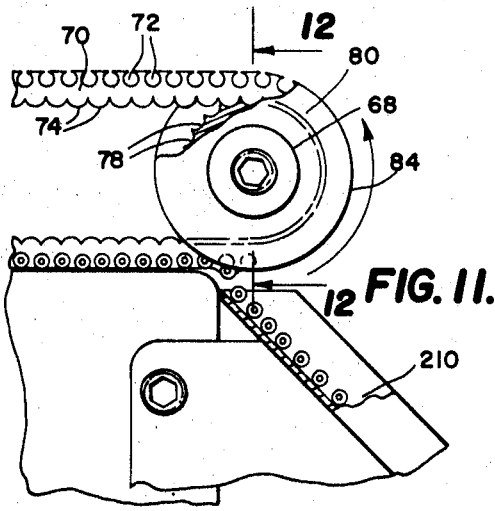
FIG. 11 is a fragmentary side elevational view of the component carrying belt of the invention and showing component ejection means which ejects finished components from the belt.
Figure 12:
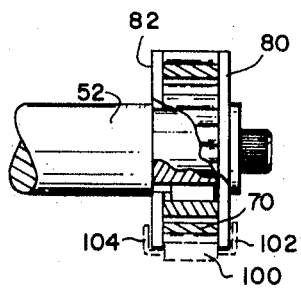
FIG. 12 is a fragmentary sectional view taken from the line 12—12 of FIG. 11 showing parts and portions in elevation to facilitate the illustration and showing by broken lines the cross-section of a component being ejected from the component carrying belt by flanges of the ejection roller of the invention.

The flanged roller 68 shown in FIG. 11 of the drawings is provided with recess portions 78 adapted to engage the conforming portions 74 of the component carrying belt 70; and outside flanges 80 and 82 are disposed at opposite sides of the portions 78 to retain the belt 70 laterally in relation to the portions 78. The flanges 80 and 82 extend beyond the component receiving recesses 72, and tend to eject components by means of engagement with their leads as will be hereinafter described in detail.

The flanges 80 and 82 are of sufficient diameter such that their peripheral portions 84 extend outward to outer extremities of the belt 72 for ejection of components from the belt, however, the flanges on the roller 66 are of lesser diameter than the flanges 80 and 82 and these have peripheral portions 86 as shown in FIG. 1 of the drawings which are inward relative to the pockets 72 and disposed inwardly beyond the central portions of the pocket 72 for receiving components and their leads as will be hereinafter described in detail.

Figure 7:
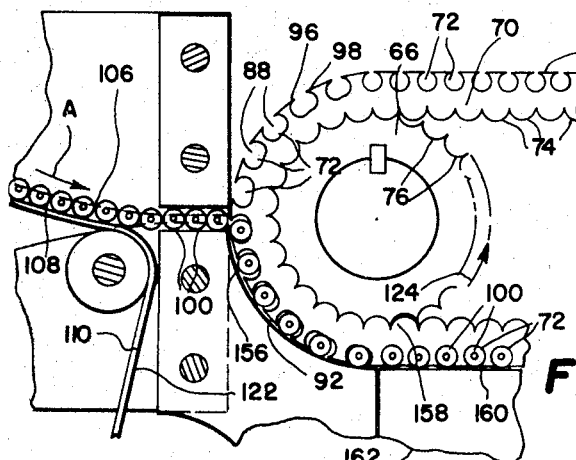
FIG. 7 is an enlarged fragmentary sectional view taken from the line 7—7 of FIG. 5, showing the component feed belt of the invention, and a belt drive roller engaging the same.

The resilient belt 70, at a location in which the belt passes over the roller 66, is resiliently distorted such that the pockets 72 are open as indicated at 88 in FIG. 7 of the drawings. The pockets 72 are generally circular in cross-section and are provided with open portions 90 as shown in FIG. 7, these portions communicating with an outer side 92 of the belt. Disposed between each opening 90 is a respective partition 94 having oppositely directed arcuate lips 96 and 98, these lips 96 and 98 overlie the pockets 72 as shown best in FIG. 8, so as to hold components in the pockets 72 of the belt as shown in FIG. 4. The components may be resistors, capacitors, or other elements generally designated 100 in FIG. 4 of the drawings, and these components have oppositely directed axial leads or conductors 102 and 104 extending from opposite ends thereof.

Figure 8:
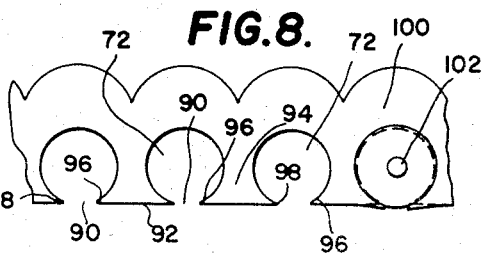
FIG. 8 is a further enlarged fragmentary sectional view similar to FIG. 7 showing details of the component feed belt.

When the pockets 72 are in this position, as indicated at 88 in FIG. 7 of the drawings, the opposed lips 96 and 98, shown in FIG. 8 of the drawings, are resiliently forced apart about the outside of the roller 68, so as to receive components passing through a guide channel 106 having a constant feed of components therethrough as will be hereinafter described in detail.

It will be appreciated by those skilled in the art, that the pockets 72 are each opened to spread the lips 96 and 98 apart as the belt passes over the periphery of the roller 66 and reaches a location at which the outer surface 92 of the belt and the lips 96 and 98 register with the feed channel 106, and components move therein, in a direction of an arrow A in FIG. 7 of the drawings, toward and into the pockets 72. With the lips 98 or 96 spread apart, they are spaced sufficiently to receive the components 100 from the feed channel 106. This feed channel 106 is provided with a guide wall 108, and the components are carried along this wall 108 by means of an adhesive tape 110 on which the components are initially assembled in substantially tangent parallel relationship to each other as shown best in FIG. 3 of the drawings.

As shown in FIGS. 1 and 2 of the drawings, the guide 106 is provided with converging walls 112 and 114 between opposite ends of which the components 100 may pass, these converging walls 112 and 114 converge to relatively narrow passage structure 116 and 118, respectively, which substantially equals the width of the belt 70 shown in FIG. 2 and the space between the wall portions 116 and 118 substantially equals the length of the components 100 as shown in FIGS. 3 and 4 of the drawings.

The passage 106 is open at opposite sides and beyond the wall portions 116 and 118 to permit the leads 104 to project outwardly and axially at opposite side edges of the belt 70 as shown in FIG. 4.

The adhesive tape 110, shown in FIGS. 1, 3 and 7, passes over a separator roller 120 directly below the passage 106, such that when the adhesive tape is pulled in the direction of the arrow B, as shown in FIG. 1 of the drawings. The components are stripped from the adhesive surface 122 of the adhesive strip 110, and forced into the passage 106 between the converging walls 112 and 114 and toward the open pockets 72 of the belt 70 which is concurrently rotated in the direction of an arrow 124 in FIG. 7 of the drawings. The tape 110 is wound onto a reel 124 rotated in the direction of an arrow 126 by means of a motor 128 shown in FIG. 18 of the drawings. This motor 128 is provided with a shaft 130 coupled by a suitable clutch 132 to a reel operating shaft 134 carried in bearings 136 supported within the bearing block 54, all is shown best in FIGS. 6 and 18.

The motor 128 is mounted by means of a bracket 138 on the rear side of the bearing block 54, all is shown best in FIG. 6 of the drawings.

This motor 128, as shown in FIG. 19 of the drawings, is coupled to conductors 140 and 142, the conductor 142 being coupled to a switch 144 which connects a conductor 146 to a battery 148 or any other suitable power source. Coupled to the conductor 140 is a lamp 150 which serves to absorb energy when the motor 128 is in a stall condition or operating slowly to strip the tape 110 from the components 100 as they are fed into the pocket 72 of the belt 70.

Pivotally mounted on the passage structure 106 is a holddown plate 152 which overlies the components 100 on the tape 110 as the tape 110 passes over a roller 154 pivotally mounted on an axle pin 156 carried by an extension 158 of the bearing block 54.

The components 100 are secured to the adhesive tape 110 preliminary to their passage over the roller 154, and the securement of these components to the adhesive tape 110 is accomplished preliminary to the operation of the structure dislcosed in the present patent application.

As shown in FIGS. 1 and 7 of the drawings, the frame of the invention, tangent to the outer surface portion 92 of the belt 70 as it passes over the roller 66, is a guide 156 which retains the components 100 in the pocket 72 until the pockets pass into a tangency position at a location substantially as indicated at 158 in FIG. 7 wherein the pockets 72 are resiliently closed by straightening of the belt 70 which brings the lips 96 and 98 close together and to thus grip the components 100 in the pockets 72 in such a manner that the lips 96 and 98 overlie substantial peripheral portions of the components 100 to hold them within the belt 70 and to carry these components 100 into positions in which cutting and forming rotors act on the opposed axial leads of the components as will be hereinafter described in detail.

Figure 10:
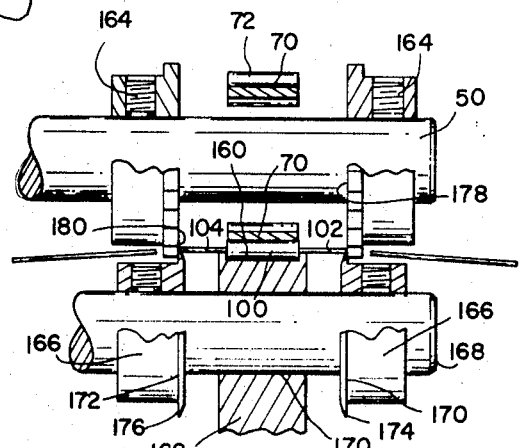
FIG. 10 is a fragmentary sectional view taken from the line 10—10 of FIG. 9 showing parts and portions in elevation to amplify the illustration.

As the components 100 are carried in the direction of the arrow 124, and beyond the location 158, an upper surface 160 of a component guide member 162 serves to support the components 100 in a substantially horizontal path as these components pass toward pairs of shearing rotors 164 and 166. A pair of the shearing rotors 164 are mounted on a shaft 50, and another pair of shearing rotors 166 are mounted on a shaft 168 which is rotatably mounted in the bearing block 54 directly below the shaft 50. Additionally, the shaft 168 is rotatably in a bearing 170 in the guide plate 162, all as shown best in FIG. 10 of the drawings.

The guide member 162 is mounted in spaced relation with the front side 64 of the bearing block 54, and mounted on the shaft 168 at opposite sides of the guide 160 are the shearing rotors 166 having sharp peripheral edges 174 and 176, respectively. These edges operate in adjacent relationship to notched flanges 178 and 180 respectively of the pair of shearing rotors 164 mounted on the shaft 50 at opposite sides of the belt 72, all is shown best in FIG. 10 of the drawings.

Figure 9:
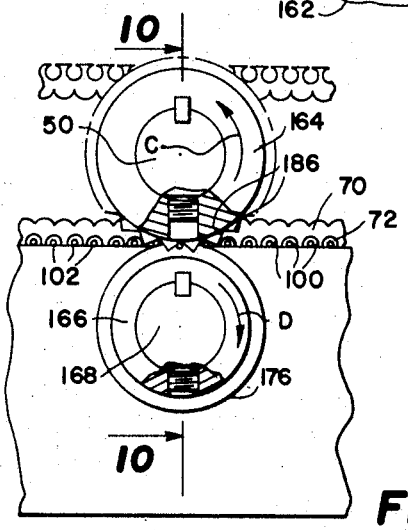
FIG. 9 is an enlarged fragmentary side elevational view of the component belt and shearing rotor structure of the invention.

As shown in FIG. 9 of the drawings, the rotors 164 are each provided with peripheral notched portions 186 spaced apart a distance equal to the spacing of the components 100 such that the spaced conductors 102 and 104 thereof, are successively engaged by successive notches 186 as the rotors operate in the directions of the arrows C and D in FIG. 9 of the drawings.

The peripheral edge portions 174 and 176 of the rotors 166 are disposed such that they extend beyond the recessed portions of the notches 186 as the rotors 166 rotate into tangent relationship with the rotors 164 respectively. Thus, the component conductors 102 and 104 are sheared off while held in the notches 186, the components being sheared by the peripheral edges 174 and 176, and the components are firmly held in the recesses or pockets 72 of the belt 70 while the component conductors 102 and 104 pass along the upper edge 160 of the guide member 162.

As the belt progresses in the direction of an arrow G in FIG. 1, the belt 70 carries the components 100 and their cutoff conductors 102 and 104 to forming rotors 188 and 190, shown best in FIGS. 1, 13, 14, 15 and 17 of the drawings. As the component belt 70 passes toward the forming rotors 188 and 190, the components 102 and 104 are engaged in valleys 192 and 194 of peripheral notches 196 in the peripheries of the rotors 188 and 190.

Inasmuch as these rotors are similar, only the rotor 188 will be hereinafter described.

Disposed directly above the belt 70, and at opposite sides thereof, are bending guide plates 198 and 200 against which the components 102 and 104 are bent upwardly as shown specifically in FIG. 17.

As the belt 70 moves the components 100 along toward the forming rotors 188 and 190, the leads passing to the valleys 192 of the rotor 188, and similarly with respect to the rotor 190, the leads are bent upwardly about an edge of the forming guide 198 and an inner face 202 of the forming rotor 188 is disposed adjacent a face 204 of the forming guide 198 so as to bend the lead 102 as shown in FIG. 17 slightly more than 90°, and equal to an additional angle K indicated in FIG. 17 so that spring back of the material of the electrical conductor 102 may result in forming the conductor to a precise right angle. It will be seen that the face 202 is provided with radially disposed slots 206 which extend from the valleys 192 of the forming rotors radially inward so that each component conductor is carried in a respective slot, such as the slots 206 of the rotor 188, as the respective conductors are formed adjacent the forming guide 198 shown in FIG. 17. The rotary forming of the conductors 102 and 104 prevents damage of the generally frangible component 100, due to the fact that the rotary action of the forming rotor 188 and also the forming rotor 190, together with the guides 198 and 200, hold the conductors adjacent the component and prevent bending at the juncture of the conductor and the component 100 and therefore avoid damage thereto.

As the belt 70 passes beyond the forming rotors 188 and 190, to the position of the roller 68, the flanges 84 of the roller 68 contact the component conductors and eject them from the pockets 72 of the belt 70 such that the components will pass downwardly through a chute 210, shown in FIG. 11, and into a suitable container for collecting the components having sheared and formed leads or conductors.

In a modification of the invention as shown in FIGS. 20, 21, and 22 of the drawings, a feed magazine 216 may feed the components 100 into the pockets 72 of the belt 70 in a manner as hereinbefore described in relation to the structure disclosed in FIG. 7 of the drawings.

The magazine 216 is provided with slotted sides 218 adapted to guide leads 102 and 104 of the components 100, these components may be fed into the magazine 216 from a holder 220 which holds the conductors 102 permitting the components as well as the conductors 104 to be slid vertically down through the magazine with the conductors 102 and 104 projecting through the slotted portions 218. Reference is made to FIG. 21 of the drawings showing the magazine 216 comprised of a pair of channeled sections 222 and 224 spaced apart to form the slots 218 through which the components 102 and 104 of the components 100 may project.

As shown in FIG. 23, a feed wheel 226 is rotatably mounted on a shaft 228 and is mounted to rotate in the direction of an arrow 230 such that soft peripheral portion 232 of the wheel 226 engages the components 100 and forces them in the direction of an arrow 232 for feeding them constantly and successively into the pockets 72 of the belt 70, this being a modification of the structure shown in FIG. 7 and substitutes for the adhesive strip 110 hereinbefore described.

In another modification shown in FIG. 23, a magazine structure 236 of conventional design is provided with a plurality of zig-zag downwardly directed angular slot guides 238 for guiding the conductors 102 and 104 of the components 100.

In the modification shown in FIG. 23, the roller 226 performs in a manner similar to the operation of the roller 226 disclosed in FIG. 20 for feeding the components 100 into the pockets 72 of the belt 70.

The roller 226 mounted on the shaft 228 is driven by a motor 240 carried on the bearing block 54; the motor 240 having a shaft 242 mounted in a bearing 244 in the bearing block 54; all is shown best in FIG. 24 of the drawings.

The motor 240 may be operated in a similar manner to the motor 128 hereinbefore described in connection with the FIG. 19 of the drawings. However, the roller 226 may rotate the components 100 about the axis of their conductors 102 and 104 to thereby permit rotation of the roller 226 at a slightly greater rate than the feed rate of the components 100 into the pockets 72.

It will be obvious to those skilled in the art that various modifications of the present invention may be resorted to in a manner limited only by a just interpretation of the following claims.

I claim:

1. In a machine for cutting and forming opposed axial conductors of electronic components, the combination of; first means for propelling a plurality of electronic components in a row, such that opposed axial conductors of said components are generally parallel relative to each other, said first means comprising a pair of axially spaced apart, circular drive pulleys and an endless belt engaged around the periphery of said pulleys, said belt having a pulley engaging inner-side and an outer-side provided with component receiving pockets therein, said pockets open toward said outer side, said belt being of flexible structure whereby said pockets are open widely when forced into an arcuate disposition around said pull and relatively contracted when said belt is relatively straight between said pulleys and such that said row of components moves in first direction laterally relative to the axis of said conductor; a pair of shearing rollers at each side of said belt of said first means said shearing roller disposed on axis substantially parallel with said conductor axis; each pair of shearing rollers disposed to cut off one of said opposed conductors in spaced relation to a respective electronic component in one of said pockets; one shearing roller of each pair having notches in its periphery, said notches disposed to receive a respective conductor of each electronic component during the shearing thereof; spaced guide means forming a guide path for guiding movement of said belt and said components, said guide means disposed to prevent substantial movement of said belt and components in a second direction laterally with respect to said conductor axis, said second direction being at an angle relative to said first direction, said guide means disposed to guide said components relative to said shearing rollers; circular forming; rotors disposed to receive remaining portions of said conductors passing from said shearing rollers, said forming rotors having a plurality of notches in their peripheries, said notches adapted to receive and engage said remaining portions of said conductors adjacent axial ends of said components, each of said last mentioned notches having a valley portion adapted to receive one of said conductors, said valley portions disposed to be rotated about the axis of each respective forming rotor in an arcuate path, said notches in a portion of said arcuate path being chordally overlapping and thus offset laterally in said second direction relative to said guide path and to the axis of said components conductors when said components are restrained in said guide means and said belt against movement in said second direction; and power operated means for driving said first means, said shearing rollers and said forming rotors such that the arcuate distance of movement of such shearing rollers and said forming rotors at their engagement with said conductors are equal and such that the movement of said row by said first means equals said arcuate distance.

2. The invention, as defined in claim 1, wherein: said belt is of resilient material, and said inner-side is provided with irregularities and the peripheries of said pulleys are provided with conforming irregularities for positively driving said belt.

3. The invention, as defined in claim 1, wherein: said pockets are provided with constricted portions at their outer openings, and relatively enlarged portions inwardly of said constricted portions, such that the constricted portions are opened considerably when said belt passes around said pulleys and is formed into an arcuate position.

4. The invention, as defined in claim 1, wherein: feed means is disposed to deliver components into said pockets at a location in which said pockets are expanded by disposition of said belt arcuately around one of said pulleys, said last mentioned means comprising guide structure communicating directly with said pockets, said guide means adapted to hold a row of components in contiguous relation with each other, and means for applying force to said row of components, whereby each component adjacent to said belt may move into one of said expanded pockets, as it is rotated past said last mentioned guide means.

5. The invention, as defined in claim 1, wherein: feed means is disposed to deliver components into said pockets at a location in which said pockets are expanded by disposition of said belt arcuately around one of said pulleys said last mentioned means comprising guide structure communicating directly with said pockets said guide means adapted to hold a row of components in contiguous relation with each other and means for applying force to said row of components whereby each component adjacent said belt may move into one of said expanded pockets as it is rotated past said last mentioned guide means; means for driving adhesive tape structure on which said components are adhesively carried, said means comprising a constant torque operated reel for reeling said adhesive tape thereon, and for forcing said components in said last mentioned guide means and toward said pockets from said belt.

6. The invention, as defined in claim 1, wherein: a gravity feed magazine extends above said belt and is provided with guide structure for guiding components into a proximity of said belt, wherein it is disposed in arcuate shape around one of said pulleys, whereby a component may be gravity fed into each of said pockets as it passes said gravity fed means.

7. The invention, as defined in claim 5, wherein: said reel is driven by a shaded pole motor having resistance means in circuit therewith for applying constant torque to said reel.

8. In a constant torque device, the combination of: a shaded pole motor; means for supplying electrical energy thereto, and resistance means in circuit with said shaded pole motor; said resistance means comprising an element adapted to operate at incandescent conditions, and surrounded and hermetically sealed in an enclosure means having an inert atmosphere therein, whereby said resistance element may operate at extremely high temperatures, and thereby quickly and almost instantaneously dissipate energy in circuit with said motor, when the rotor thereof is locked and whereby said motor is capable of instantaneously applying torque when the load thereon decreases slightly.

References Cited

UNITED STATES PATENTS

| 2,834,393 | 5/1958 | Gihlar et al. | 72—384 |
| 2,854,054 | 9/1958 | Gross | 72—384 |
| 3,270,264 | 8/1966 | Miner | 318—223 |

RONALD D. GREFE, *Primary Examiner.*

U.S. Cl. X.R.

29—203; 72—384, 405; 318—223